US007340331B2

(12) United States Patent
Welch

(10) Patent No.: US 7,340,331 B2
(45) Date of Patent: Mar. 4, 2008

(54) VEHICLE DATA RECORDER USING DIGITAL AND ANALOG DIAGNOSTIC DATA

(75) Inventor: William L. Welch, Shanghai (CN)

(73) Assignee: Snap-On Incorporated, Pleasant Prairie, WI (US)

( * ) Notice: Subject to any disclaimer, the term of this patent is extended or adjusted under 35 U.S.C. 154(b) by 272 days.

(21) Appl. No.: 10/916,448

(22) Filed: Aug. 12, 2004

(65) Prior Publication Data

US 2006/0047380 A1 Mar. 2, 2006

(51) Int. Cl.
*G01M 17/00* (2006.01)
*G21C 17/00* (2006.01)

(52) U.S. Cl. .......................... 701/29; 701/35; 702/183

(58) Field of Classification Search ............ 701/29–36; 702/182–184; 714/25; 307/9.1, 10.1; 340/425.5
See application file for complete search history.

(56) References Cited

U.S. PATENT DOCUMENTS 4,817,118 A 3/1989 Wilburn et al.
5,730,526 A * 3/1998 Davis et al. .................. 374/45
6,208,919 B1 3/2001 Barkesseh et al.
6,424,157 B1 * 7/2002 Gollomp et al. ............ 324/430
6,427,102 B1 * 7/2002 Ding ........................... 701/34
7,020,546 B2 * 3/2006 Nagai et al. .................. 701/29

FOREIGN PATENT DOCUMENTS

WO WO 03/077205 A2 9/2003
WO WO 2004/044546 A1 5/2004

* cited by examiner

*Primary Examiner*—Yonel Beaulieu
(74) *Attorney, Agent, or Firm*—McDermott Will & Emery LLP

(57) ABSTRACT

A vehicle diagnostic system monitors user-selected analog diagnostic data that is received from a vehicle to determine whether it meets a user-specified trigger characteristic and records user-selected digital diagnostic data that is received from the vehicle in response to a determination that the trigger characteristic has been met. The user-selected monitored diagnostic data may instead be digital and the user-selected recorded diagnostic data may instead be analog. The user may make both selections from a set of analog and digital diagnostic data types. Other features, objects, benefits, components, methods and variations are also disclosed.

31 Claims, 3 Drawing Sheets

| | Monitored / Recorded Diagnostic Data Types | |
|---|---|---|
| | Monitored Type | Recorded Type |
| 401 | Digital | Analog |
| 403 | Analog | Digital |
| 405 | Digital | Digital |
| 407 | Analog | Analog |
| 409 | Digital | Digital and Analog |
| 411 | Analog | Digital and Analog |
| 413 | Digital and Analog | Digital |
| 415 | Digital and Analog | Analog |
| 417 | Digital and Analog | Digital and Analog |

VEHICLE DATA RECORDER USING DIGITAL AND ANALOG DIAGNOSTIC DATA

BACKGROUND

1. Field

This application relates to vehicle diagnostic systems, including systems that diagnose motor vehicles, systems that include data recorders, and systems that process digital diagnostic data from a data stream.

2. Description of Related Art

Some vehicle diagnostic systems are configured with a connector that connects to a digital data port on the vehicle. Requests for different types of digital diagnostic data may be delivered through the port by the vehicle diagnostic system to the vehicle. Digital diagnostic data may then be sent in response through the port by the vehicle and back to the vehicle diagnostic system for analysis.

Some vehicle diagnostic systems include a data recorder. The user may enter a threshold value for a monitored signal that triggers the recordation of digital diagnostic data when the threshold is reached.

Unfortunately, systems of this type may fail to enable certain problems to be rapidly diagnosed. In some cases, this failure may be traceable to limitations in the ability of the system to access certain types of diagnostic information.

For example, a defective potentiometer may cause the acceleration of an engine in a vehicle to be choppy. The test requests that may be delivered through the vehicle's data port, however, may be insufficient to result in diagnostic information that readily illuminates this malfunction.

Analog test equipment, such as an oscilloscope, has also been used. This equipment may allow defects that are not readily detectable through a connection with the vehicle's data port to be studied. However, the defect may be erratic or may only appear for a very brief moment. These as well as other characteristics can make it difficult for even analog test equipment to capture the data that is clearly indicative of the defect. As a result, analog diagnostic equipment may also not readily illuminate a defect.

SUMMARY

A vehicle diagnostic system may include a trigger data storage system, a diagnostic data storage system and a processing system.

The trigger data storage system may be configured to store the identity of diagnostic data from a vehicle that is to be monitored for a trigger characteristic. The trigger data storage system may also be configured to store the trigger characteristic and the identity of diagnostic data from a vehicle that is to be recorded in response to detection of the trigger characteristic in the diagnostic data that is to be monitored.

The diagnostic data storage system may be configured to store diagnostic data from the vehicle.

The processing system may be configured to cause the vehicle diagnostic system to receive a selection of diagnostic data that is to be monitored for a trigger characteristic from a user of the vehicle diagnostic system. The user may select from among both digital and analog diagnostic data types that may be received from the vehicle. The processing system may also be configured to cause the vehicle diagnostic system to receive from the user the trigger characteristic and a selection of diagnostic data that is to be recorded in response to detection of the trigger characteristic from among both the digital and analog diagnostic data types. The processing system may also be configured to store the selections and the trigger characteristic in the trigger data storage system; read the selections and the trigger characteristic from the trigger data storage system; receive both analog and digital diagnostic datatrom the vehicle, including the selection of diagnostic data that is to be monitored and the selection of diagnostic data that is to be recorded; monitor the received diagnostic data that was selected to be monitored to determine whether it meets the user-specified trigger characteristic; and record the received diagnostic data that was selected to be recorded in the diagnostic data storage system in response to a determination that the trigger characteristic has been met.

The processing system may be further configured to cause user-selected digital diagnostic data to be recorded in response to user-selected analog diagnostic data meeting the trigger characteristic.

The processing system may be further configured to cause user-selected analog diagnostic data to be recorded in response to user-selected digital diagnostic data meeting the trigger characteristic.

The trigger data storage system may be configured to store an identification of diagnostic data to be monitored of both the digital and analog type, a trigger characteristic of both analog and digital diagnostic data, and an identification of diagnostic data to be recorded of both the digital and analog type.

The diagnostic data storage system may be configured to store diagnostic data of both the analog and digital type.

The trigger data storage system may be further configured to store a commencement time for recording the diagnostic data that is to be recorded relative to when a determination has been made that the trigger characteristic has been met.

The processing system may be further configured to cause the vehicle diagnostic system to receive a commencement time from the user for recording the diagnostic data that is to be recorded relative to when a determination has been made that the trigger characteristic has been met; store the commencement time in the trigger data storage system; read the commencement time from the trigger data storage system; and begin recording the received diagnostic data that was selected to be recorded at the commencement time.

The trigger storage system and the processing system may be configured such that the commencement time may be specified to be at a time before or after the trigger characteristic is met.

The trigger data storage system may be further configured to store a recording length for recording the diagnostic data that is to be recorded.

The processing system may be further configured to cause the vehicle diagnostic system to receive a recording length for recording the diagnostic data that is to be recorded from the user; store the recording length in the trigger data storage system; read the recording length from the trigger data storage system; and record the received diagnostic data that was selected to be recorded for the recording length in response to a determination that the trigger characteristic has been met.

The processing system may be configured to cause the vehicle diagnostic system to repeatedly request certain types of digital diagnostic information that may be selected to be recorded from the vehicle.

The processing system may be configured to cause the vehicle diagnostic system to repeatedly request certain types of digital diagnostic information that may be selected to be monitored from the vehicle.

The vehicle diagnostic system may include a digital data connector configured to connect to a data port on the vehicle.

The vehicle diagnostic system may include an analog probe configured to extract analog diagnostic information from the vehicle.

The vehicle diagnostic system may include a display configured to communicate diagnostic data that is recorded in the diagnostic data storage system to the user.

The processing system may be further configured to cause the diagnostic data that is stored in the diagnostic data storage system to be delivered to the display when requested by the user.

A vehicle diagnostic method may include receiving from a user a selection of diagnostic data that is to be monitored for a trigger characteristic from among both digital and analog diagnostic data types that may be received from a vehicle. The vehicle diagnostic method may also include receiving from a user the trigger characteristic and a selection of diagnostic data that is to be recorded in response to detection of the trigger characteristic from among both the digital and analog diagnostic data types. The vehicle diagnostic method may also include storing the selections and the trigger characteristic; reading the selections and the trigger characteristic; receiving the selection of diagnostic data from the vehicle; monitoring the received diagnostic data that was selected to be monitored to determine whether it meets the user-specified trigger characteristic; and recording the received diagnostic data that was selected to be recorded in response to a determination that the trigger characteristic has been met.

User selected digital diagnostic data may be recorded in response to user-selected analog diagnostic data meeting the trigger characteristic.

User-selected analog diagnostic data may be recorded in response to user-selected digital diagnostic data meeting the trigger characteristic.

The vehicle diagnostic method may also include receiving a commencement time from the user for recording the diagnostic data that is to be recorded relative to when a determination that the trigger characteristic has been met; storing the commencement time; reading the commencement time; and beginning to record the received diagnostic data that was selected to be recorded at the commencement time.

The commencement time may be before or after the trigger characteristic is met.

The vehicle diagnostic method may include receiving a recording length from the user for recording the diagnostic data that is to be recorded; storing the recording length; reading the recording length; and recording the received diagnostic data that was selected to be recorded for the recording length in response to a determination that the trigger characteristic has been met.

The vehicle diagnostic method may include repeatedly requesting from the vehicle the digital diagnostic information that was selected to be recorded.

The vehicle diagnostic method may include repeatedly requesting from the vehicle the digital diagnostic information that was selected to be monitored.

The vehicle diagnostic method may include connecting a digital data connector to a data port on the vehicle and attaching an analog probe to the vehicle.

The vehicle diagnostic method may include delivering the diagnostic data that is stored to a display when requested by the user.

A vehicle diagnostic system may include a processing system configured to cause the vehicle diagnostic system to monitor analog diagnostic data that is received from a vehicle to determine whether it meets a user-specified trigger characteristic and to record digital diagnostic data that is received from the vehicle in response to a determination that the trigger characteristic has been met.

The processing system may be configured to cause the vehicle diagnostic system to receive a selection from a user of the analog diagnostic data that is to be monitored and the digital diagnostic data that is to be recorded, both from among analog and digital diagnostic data types that may be received from the vehicle.

A vehicle diagnostic method may include monitoring analog diagnostic data that is received from a vehicle to determine whether it meets a user-specified trigger characteristic and recording digital diagnostic data that is received from the vehicle in response to a determination that the trigger characteristic has been met.

The vehicle diagnostic method may include receiving a selection from a user of the analog diagnostic data that is to be monitored and the digital diagnostic data that is to be recorded, both from among analog and digital data types that may be received-from the vehicle.

A vehicle diagnostic system may include a processing system configured to cause the vehicle diagnostic system to monitor digital diagnostic data that is received from a vehicle to determine whether it meets a user-specified trigger characteristic and to record analog diagnostic data that is received from the vehicle in response to a determination that the trigger characteristic has been met.

The processing system may be configured to cause the vehicle diagnostic system to receive from a user a selection of the digital diagnostic data that is to be monitored and the analog diagnostic data that is to be recorded, both from among analog and digital data types that may be received from the vehicle.

A vehicle diagnostic method may include monitoring digital diagnostic data that is received from a vehicle to determine whether it meets a user-specified trigger characteristic and recording analog diagnostic data that is received from the vehicle in response to a determination that the trigger characteristic has been met.

The vehicle diagnostic method may include receiving a selection from a user of the digital diagnostic data that is to be monitored and the analog diagnostic data that is to be recorded, both from among analog and digital data types that may be received from the vehicle.

These as well as still further features, objects, benefits, components, steps, methods and structures will now become clear from a review of the detailed description of illustrative embodiments and the accompanying drawings.

DETAILED DESCRIPTION OF ILLUSTRATIVE EMBODIMENTS

Figures 1, 4:
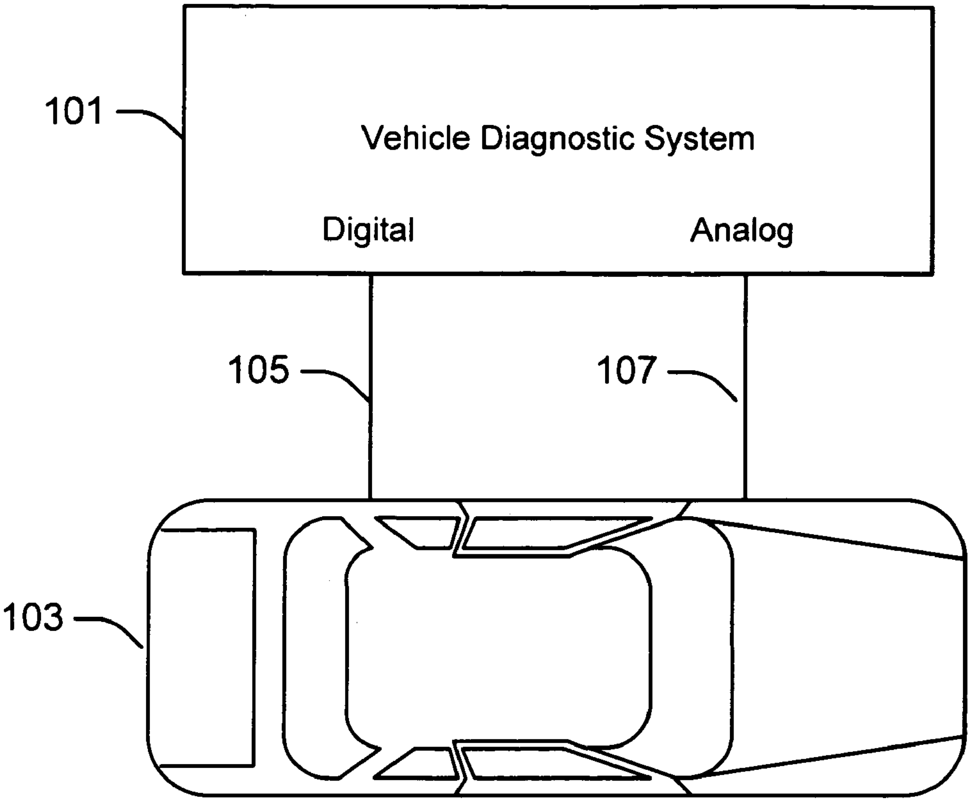
FIG. 1 illustrates a vehicle diagnostic system with digital and analog diagnostic data communication links to a vehicle.
FIG. 4 is a table of monitored and recorded diagnostic data types.

FIG. 1 illustrates a vehicle diagnostic system with digital and analog diagnostic data communication links to a vehicle. As shown in FIG. 1, a vehicle diagnostic system 101 may be in communication with a vehicle 103, such as, for example, by being connected to the vehicle 103.

Digital diagnostic data may be communicated from the vehicle 103 to the vehicle diagnostic system 101 over a digital diagnostic data communication link 105. Analog diagnostic data may be communicated to the vehicle diagnostic system 101 over an analog diagnostic data communication link 107.

The vehicle 103 may be any type of vehicle. It may be a motor vehicle, such as an automobile, truck or motorcycle. It may be a watercraft, such as a ship or boat. It may be an aircraft, such as an airplane. It may be a spacecraft.

The digital diagnostic data communication link 105 may be any type of communication link configured to communicate digital data. It may be wired, wireless or a combination of both types.

The analog diagnostic data communication link 107 may be any type of communication link configured to communicate analog data. It may be wired, wireless or a combination of both types.

Although the digital diagnostic data communication link 105 is shown as being separate from the analog diagnostic data communication link 107, a single link may instead be used for both purposes. In this instance, the communication link may be configured to accurately communicate both types of diagnostic data.

Figure 2:
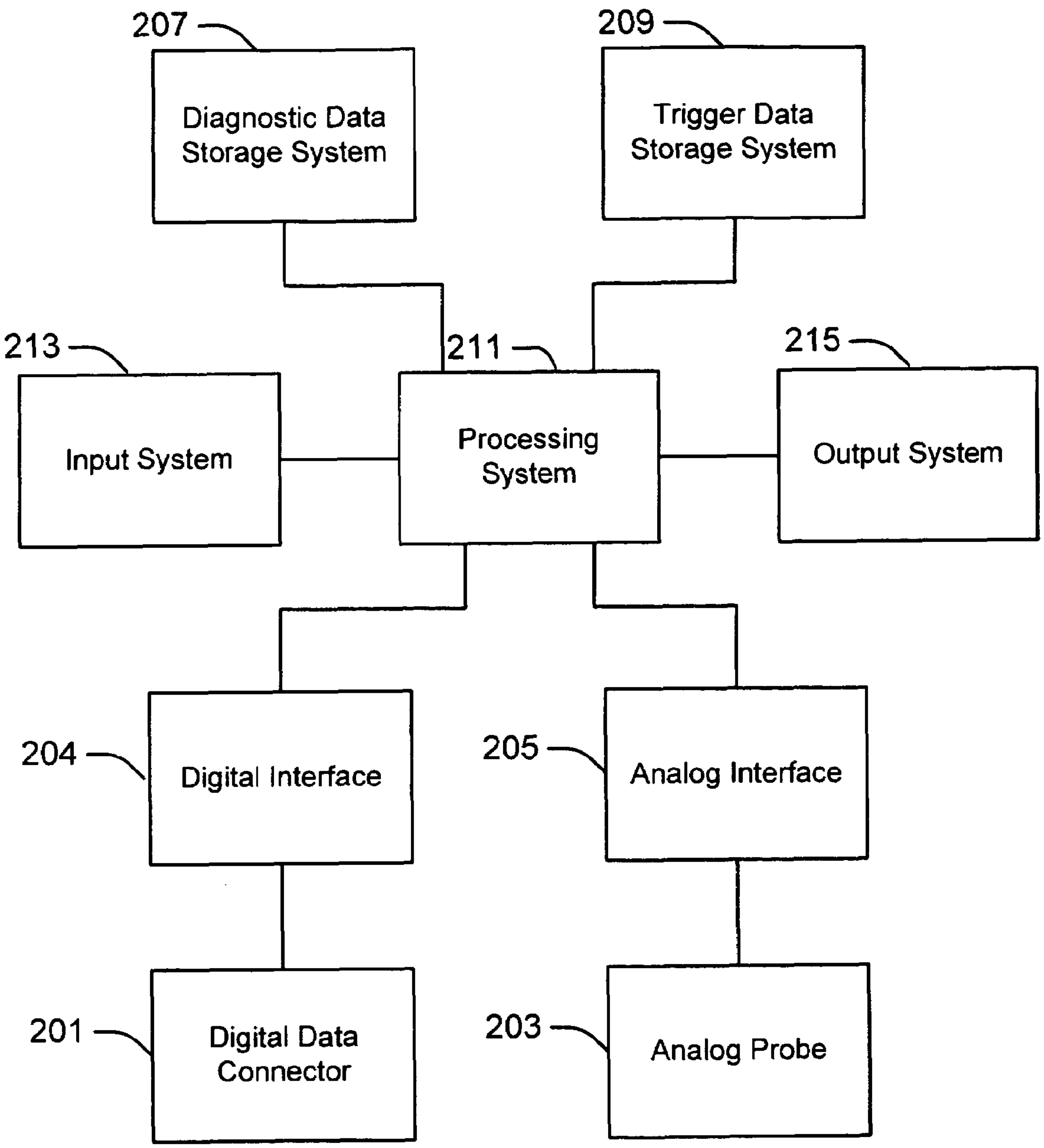
FIG. 2 is a block diagram of one embodiment of the vehicle diagnostic system shown in FIG. 1.

FIG. 2 is a block diagram of one embodiment of the vehicle diagnostic system shown in FIG. 1.

As shown in FIG. 2, a digital data connector 201 may be used to connect the vehicle diagnostic system 101 to the vehicle 103. The digital data connector 201 may be configured so that it can be plugged into a data port on the vehicle 103. Digital diagnostic data may be delivered by the vehicle 103 to the vehicle diagnostic system 101 through the digital data connector 201.

The vehicle diagnostic system may also include an analog probe 203. The analog probe 203 may include an alligator clip, a spring-loaded hook and/or any other type of apparatus that allows a connection to be rapidly made with and broken from a data location in the vehicle 103. The analog probe 203 may connect electronically, magnetically, optically or in any other manner to the vehicle 103 to obtain the needed analog diagnostic data from the vehicle 103.

The vehicle diagnostic system 101 may also include a digital interface 204. The digital interface 204 may be configured to interface the digital diagnostic data from the digital data connector 201 with the remaining portions of the vehicle diagnostic system 101. The digital interface 204 may effectuate isolation between the vehicle diagnostic system 101 and the vehicle 103, a change in voltage or current levels, a change in impedance, a change in timing, a change in form, and/or any other type of change or other type of interface function.

The vehicle diagnostic system may also include an analog interface 205. The analog interface 205 may be configured to interface the analog diagnostic data from the analog probe 203 with the remaining portions of the vehicle diagnostic system 101. The analog interface 205 may effectuate isolation between the vehicle digital diagnostic system 101 and the vehicle 103, a change in voltage or current levels, a change in impedance, a change in timing, a change in form, and/or any other type of change or other type of interface function.

In addition or instead, the analog interface 205 may digitize the analog diagnostic data for use within the vehicle diagnostic system 101. The analog diagnostic data may in addition or instead be processed within the vehicle diagnostic system 101 in its analog format or in another analog format.

The vehicle diagnostic system 101 may include a diagnostic data storage system 207. The diagnostic data storage system 207 may be configured to store selected diagnostic data when requested to do so. The diagnostic data storage system 207 may be configured to store selected diagnostic data that is both of the analog and of the digital type. The same or different types of memory devices may be used to store the different types of diagnostic data. If the analog diagnostic data is converted into digital data by the analog interface 205, for example, the same type of memory may be used in the diagnostic data storage system 207 to store both the digital and the analog types of diagnostic data. On the other hand, if recordation of the analog diagnostic data is desired in analog format, the type of memory that is used to store this analog diagnostic data may be different from the type that is used to store the digital diagnostic data. Even when the analog diagnostic data is converted to digital data and is to be stored only in digital format, the type of storage for the digitized analog diagnostic data may be different from the type for the digital diagnostic data.

Any type of storage system may be used for the diagnostic data storage system 207. It may include, for example, a hard drive, RAM, magnetic tape, CDs and/or DVDs. The diagnostic data storage system 207 may be at a single location or may be distributed over multiple locations. It may include one or several types of memory devices.

The vehicle diagnostic system 101 may also include a trigger data storage system 209. The trigger data storage system 209 may be configured to store a broad array of information relating to diagnostic data that a user of the vehicle diagnostic system 101 wishes to be stored in the diagnostic data storage system 207.

For example, the trigger data storage system 209 may be configured to store the identity of diagnostic data from a vehicle that is to be monitored for a characteristic that will trigger the recordation of diagnostic data. The trigger data storage system 209 may be configured so that it may store the identity of diagnostic data to be monitored of both the digital and analog type. In some cases, the identification of analog diagnostic data may require a different storage format than the identification of digital diagnostic data. In other cases, the same format may be used for both types.

In some cases, there may be only one type of analog diagnostic data, namely the analog diagnostic data that is delivered from the data location in the vehicle to which the analog probe 203 has been coupled. At the same time, there may be several-types of digital diagnostic information that may be obtained through the digital data connector 201. In this case, the trigger data storage system 209 may be configured to store the user's selection of the analog diagnostic data from among this set. This may or may not require a selection of the analog diagnostic data to be stored in a type of memory device that is different from the type needed to store a a selection of digital diagnostic data.

The trigger data storage system 209 may also be configured to store a trigger characteristic that defines a characteristic in the monitored diagnostic data that, when detected, should cause selected diagnostic data to be recorded.

The trigger data storage system 209 may be configured to store any type of trigger characteristic. For example, the trigger characteristic may involve a positive or negative voltage or current threshold, a voltage or current window, a timing criteria, or any other type of characteristic. The trigger characteristic may include a set of characteristics that may occur sequentially, simultaneously, or in a combination of these ways. The trigger characteristic may also be based on several types of diagnostic data, not merely a single type. The use of the word "characteristic" herein is intended to embrace all of these variations.

The trigger data storage system 209 may also be configured to store an identification of the diagnostic data from a vehicle that is to be recorded in response to detection of the trigger characteristic in the diagnostic data that is to be monitored. All of the same criteria and variations that were discussed above in connection with the storage of the identification of the monitored diagnostic data apply equally here to the storage of the identification of the recorded diagnostic data. For example, the trigger data storage system 209 may be configured so that it may store the identity of diagnostic data to be recorded of both the digital and analog type. As with the diagnostic data that is to be monitored, moreover, the diagnostic data that is to be recorded may be only of one type or may be of multiple types.

The trigger data storage system 209 may also be configured to store other types of information relating to the trigger event. For example, the trigger data storage system 209 may be configured to store the commencement time for recording the diagnostic data with respect to the trigger event. That commencement time may be a pre-determined amount of time before the trigger event, a pre-determined amount of time after the trigger event, or upon the occurrence of the trigger event.

The trigger data storage system 209 may also be configured to store the recording length for recording the diagnostic data that is to be recorded. This may be a fixed number or may be a calculated number based on other criteria.

The trigger data storage system 209 may include any type and configuration of memory device or devices, including any of the types and configurations that were discussed above in connection with the diagnostic data storage system 207.

The vehicle diagnostic system may include a processing system 211. The processing system 211 may be configured to cause the vehicle diagnostic system to perform any function, including one or more of the functions that are described in this application. The processing system 211 may include hardware and/or software. The processing system 211 may include a dedicated computer or a general purpose computer, such as a PC. The processing system 211 may be located with all of the other components illustrated in FIG. 2, may be at a location that is different from one or more of the other components illustrated in FIG. 2, or may distributed over several locations. The processing system 211 may or may not be part of or in communication with a computer network. All or portions of the diagnostic data storage system 207 and/or the trigger data storage system 209 may be a part of and/or shared with the processing system 211. For example, RAM and/or registers in the processing system 211 may be used as all or part of the trigger data storage system 209.

The vehicle diagnostic system may also include an input system 213. The input system 213 may be configured to allow the user of the vehicle diagnostic system 101 to communicate information to the vehicle diagnostic system 101, such as information that may be stored in the trigger data storage system 209 and/or information about the operations of the vehicle diagnostic system 101 that are desired. The input system 213 may include any type of input device, including a touch screen, keyboard, mouse and/or communication link with another system.

The vehicle diagnostic system 101 may also include an output system 215. The output system may be configured to communicate information from the vehicle diagnostic system 101 to the user, such as information showing the status of operations, the content of diagnostic information that is being received from the vehicle and/or diagnostic information that has been stored in the diagnostic data storage system 207. The output system 215 may include any type of output device, including a display, such as a touch screen, a loudspeaker and/or a communication link with another system.

Figure 3:
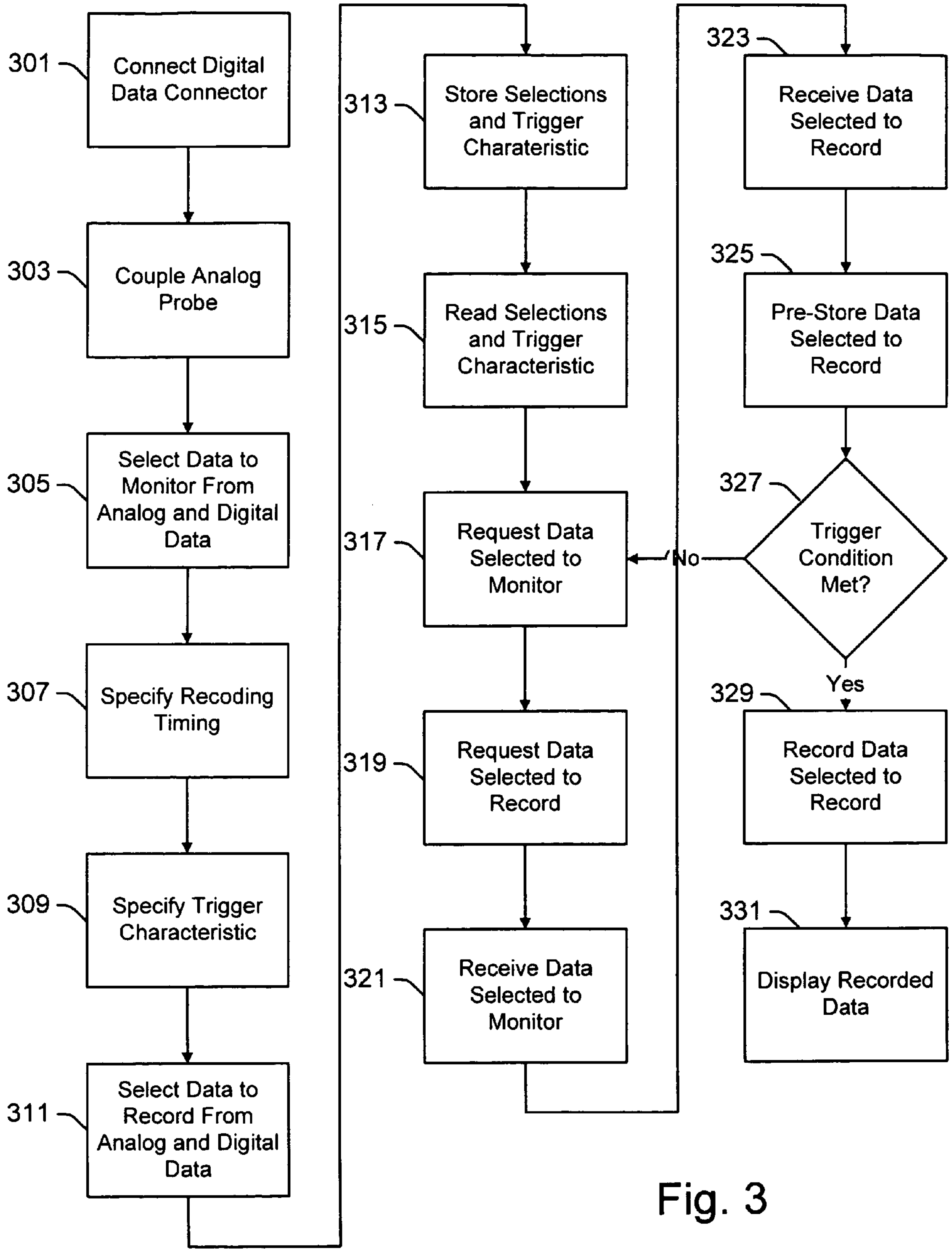
FIG. 3 is a flow diagram of one embodiment of a method that may be implemented by the vehicle diagnostic system shown in FIGS. 1 and 2.

FIG. 3 is a flow diagram of one embodiment of a method that may be implemented by the vehicle diagnostic system shown in FIGS. 1 and 2.

As shown in FIG. 3, the digital data connector 201 may be connected to the vehicle 103, as reflected by a Connect Digital Data Connector step 301. The analog probe 203 may also be connected to the vehicle, as reflected by a Connect Analog Probe step 303. The analog probe 203 may be connected to an electrical connection point in the vehicle that is not readily diagnosed by the digital diagnostic data that may be obtainable through the digital data connector 201. Clipping the analog probe 203 on the arm of a potentiometer is an example. Placing a magnetically-coupled version of the analog probe 203 next to an ignition coil is another example. Placing an optically-coupled version of the analog probe 203 next to a flywheel is another example.

A user of the vehicle diagnostic system 101 may select the diagnostic data to be monitored for the trigger characteristic, as reflected by a Select Data to Monitor From Analog and Digital Data step 305. The user may make this selection from a set consisting of both analog diagnostic data and digital diagnostic data.

In one embodiment, there may be only one type of analog diagnostic data that is available, namely the analog diagnostic data that is delivered to the location in the vehicle to which the analog probe 203 is coupled. At the same time, there may be multiple types of digital diagnostic data. In this embodiment, the user may select one or more of the types of diagnostic data to be monitored from this analog and digital diagnostic data set.

Any type of approach for selecting the diagnostic data to be monitored may be used. This may include, for example, presenting a list of the types of diagnostic data on the screen and allowing the user to make a selection of one or more of these types. It may instead or in addition include typing the identify of the desired diagnostic data on a keyboard. It may also or instead include actuating one or more mechanical switches, such as a rotary switch, toggle switch or push button.

The user may specify recording timing, as reflected by a Specify Recording Timing step 307. The specified recording timing may include information about when recording of the diagnostic data that was selected to record should begin with respect to the trigger event and for how long. The processing system 211 may allow the user to enter any or all of the types of recording timing information that were discussed above in connection with the trigger data storage system 209. This information may be entered by the user through any means, including a touch screen, keyboard, mouse, and/or any form of mechanical switch or switches.

The user may specify a trigger characteristic, as reflected by a Specify Trigger Characteristic step 309. The trigger characteristic may specify a characteristic of the diagnostic data that is to be monitored that, when detected, causes recordation of the diagnostic data that is to be recorded. The system may be configured to allow the user to enter any or all of the types of trigger characteristics that were discussed above in connection with the trigger data storage system 209.

The user may select the diagnostic data to record, as reflected by a Select Data to Record From Analog and Digital Data step 311. The system may be configured to allow the user to make this selection from any of the types of sets and using any of the types of techniques that were discussed above in connection with the Select Data to Monitor From Analog and Digital Data step 305. For example, the user may select the diagnostic data to record from a set containing both analog and digital diagnostic data types.

The vehicle diagnostic system 101 under the control of the processing system 211 may cause the selections that the user made of the diagnostic data to monitor and the diagnostic data to record to be stored in the trigger data storage system 209, along with the trigger characteristic that the user specified, as reflected by a Store Selections and Trigger Characteristic step 313.

The processing system 211 may cause the vehicle diagnostic system to read the selections and trigger characteristic from the trigger data storage system 209, as reflected by a Read Selections and Trigger Characteristic step 315. The Store and Read operations that are reflected in steps 313 and 315 include storing the information in a register that is part of the processing system 211 and accessing that information in the register when needed.

The processing system 211 may cause the vehicle diagnostic system 101 to send a request to the vehicle 103 for the diagnostic data that the user has selected to monitor, as reflected by a Request Data Selected to Monitor step 317.

If the diagnostic data that was selected to monitor is the diagnostic data detected by the analog probe 203, there may be no need to request this data. It may be automatically available. On the other hand, if the diagnostic data that was selected to be monitored is one of the types of digital diagnostic data that may delivered by the vehicle 103 through its data port to the digital data connector 201, the system may need to be configured to request that specific digital diagnostic data. Some systems, for example, utilize a data stream communication technique that requires a specific request for a particular type of digital diagnostic data to be delivered into the data port of the vehicle 103 before the vehicle 103 returns the desired type of digital diagnostic information to the data port. The implementation of a request for this specific type of digital diagnostic information, as reflected by the step 317, may therefore be useful.

The processing system 211 may cause the vehicle diagnostic system 101 to request the diagnostic data that was selected to record from the vehicle 103, as reflected by a Request Data Selected to Record step 319. The same considerations that were discussed above in connection with the Request Data Selected to Monitor step 317 apply equally here. For example, such a request may not be needed if the diagnostic data that has been selected to record is the analog data that is detected by the analog probe 203. Such a request may be needed, on the other hand, if the selected diagnostic data to record is digital diagnostic data that would not be delivered by the vehicle 103 without a specific request for it.

Another consideration concerning the Request Data Selected to Record step 319 is its timing. The request for the diagnostic data that has been selected to record may be made before the trigger characteristic has been met or may be made only afterwards. If the vehicle diagnostic system 101 is configured to allow the user to request diagnostic data to be recoded before the trigger characteristic is met, it may be necessary to issue this request before the trigger characteristic is met so that the diagnostic data that is selected to record that is generated before the trigger event will be available for recordation upon occurrence of the trigger event.

If the vehicle diagnostic system 101 is not configured to allow the user to request the recordation of diagnostic data before the trigger event, on the other hand, this advance request for the diagnostic data to be recorded may not be needed. Even if the vehicle diagnostic system 101 is configured to allow the user to request that diagnostic data be recorded before the trigger event, this advance request may still not be needed if the user, in fact, has not opted to utilize this feature.

The vehicle diagnostic system 101 may receive the diagnostic data that was selected to be monitored, as reflected by a Receive Data Selected to Monitor step 321.

The vehicle diagnostic system 101 may receive the diagnostic data that was selected to be recorded, as reflected by a Receive Data Selected to Record step 323. Again, there may be no need to receive the diagnostic data that was selected to be recorded prior to the trigger event if the vehicle diagnostic system 101 does not allow such a function to be requested or if the user has not requested it.

The vehicle diagnostic system may also pre-store the diagnostic data that was selected to be recorded, as reflected by a Pre-Store Data Selected to Record step 325. This function may be useful in those situations in which the vehicle diagnostic system 101 allows the user to request recordation of diagnostic data before the trigger event and in which the user has asked to use this function. Otherwise, this function may not be needed.

The processing system 211 may be configured to cause the pre-storage of the diagnostic data that is specified to be recorded to be retained for a pre-determined amount of time or for an amount of time that is equal to or otherwise based on the recording time period specified in connection with the Specify Recording Timing step 307.

Any type of apparatus may be used to pre-store the diagnostic data to be recorded. For example, a portion of the diagnostic data storage system 207 may be used to pre-store the diagnostic data that has been selected to be recorded under the control of the processing system 211.

The processing system 211 may cause the vehicle diagnostic system 101 to determine whether the diagnostic data that has been selected to monitor has met the trigger condition, as reflected by a Trigger Condition Met? decision step 327.

If the trigger condition has not yet been met, the method may return to receive new diagnostic data to be monitored, as well as new diagnostic data that is to be recorded. This may all again take place as discussed above in connection with steps 317, 319, 321, 323 and 325. This cycle may continue until the user intervenes by stopping the process, the process disengages pursuant to some type of pre-programmed automated control, or the trigger condition is met.

In some systems or in connection with some types of diagnostic data requests, it may not be necessary to repeat the request in order to receive constant updates of the diagnostic data. In these instances, steps 317 and 319 may not need to be performed after the first time. In other systems or in connection with some types of diagnostic data requests, these steps will need to be repeatedly performed to insure a steady-stream of diagnostic data.

If the trigger condition is met, the diagnostic data that was specified to be recorded may then be recorded in the diagnostic data storage system 207 under the control of the processing system 211 in accordance with the recording timing that was specified in step 307, as reflected by a Record Data Selected to Record step 329. In the event that the recording timing that was specified in step 307 included a specification to include diagnostic data that was generated before the trigger event, those specified portions that were pre-stored pursuant to the Pre-Store Data Selected to Record step 325 may be move to the diagnostic data storage system 207 or, if already there, designated as at least part of the diagnostic data that is to be stored in response to the trigger event.

If no request for the diagnostic data to be recorded was made prior to the trigger event, it may be necessary for the processing system 211 to issue a request for the diagnostic data as part of the Record Data Selected to Be Recorded step 329. As discussed above, moreover, it may also be necessary in some systems or in connection with certain types of diagnostic data to repeatedly issue requests for the diagnostic data to insure a steady stream of data for recordation purposes. The diagnostic data to be recorded may continue to be recorded in the diagnostic data storage system 207 until any recording length that the user may have specified has been satsified.

The diagnostic data that has been stored in the diagnostic data storage system 207 may be delivered to the output system 215, such as to a display, at any time, as reflected by a Display Recorded Data step 331. The delivery may be in accordance with some pre-programmed automated scheme or may be in response to a request for the data by the user. The output system 215 may also be configured under the control of the processing system 211 to display other types of information.

FIG. 4 is a table of monitored and recorded diagnostic data types. It illustrates the various combinations of diagnostic data type selections that a user may make during steps 305 and 311. As shown in row 401 of FIG. 4, a user may selected digital diagnostic data to monitor and analog diagnostic data to record. Conversely, and as shown in row 403, a user may select analog diagnostic data to monitor and digital diagnostic data to record. As shown in row 405, a user may instead select digital diagnostic data for both monitoring and recording. As shown in row 407, a user may instead select analog diagnostic data for both monitoring and recording. As shown in rows 409, 411, 413, 415 and 417, moreover, either the monitored type of data, the recorded type of data, or both may include both analog and digital data.

The features, objects, benefits, components, steps, methods and structures that have been described are for illustration only. They are not intended to be exhaustive or to specify any limits on the scope of protection. Numerous modifications may be made.

For example, the vehicle diagnostic system 101 may include more, less and/or different components than are illustrated in FIG. 2. Similarly, the method that is implemented by the vehicle diagnostic system 101 may have more, less or different steps than those illustrated in FIG. 3. It may also or instead have steps that are in a sequence that is different from those illustrated in FIG. 3. For example, the steps 301, 303, 305, 307, 309 and 311 may take place in any order. Similarly, the steps 319 and 323 may not take place until after the trigger condition has been met, in which event there may be no need for the step 325.

The word "length" as used herein may represent an amount of time. It may instead represent an amount data, such as a number of bytes of information. If video information is involved, it may instead represent a number of video frames, each fram being a single refresh of all data parameters. The use of the word "time" may similarly represent physical time, as well as a size of data or a number of video frames.

The embodiments that have been described may include or be utilized with any appropriate voltage source, such as a battery, an alternator and the like, providing any appropriate voltage, such as about 12 volts, 42 volts and the like.

The embodiments that have been described may be used with any desired system or engine. The system or engine may use fossil fuel, such as gasoline, natural gas, propane and the like, electricity, such as that generated by a battery, magneto, solar cell and the like, wind and hybrids, or any combinations thereof. The system or engine may be incorporated into other systems, such as an automobile, a truck, a boat, a ship, a motorcycle, a generator, an airplane and the like.

In short, protection is limited solely by the claims that now follow.

I claim:

1. A vehicle diagnostic system comprising:

a trigger data storage system configured to store:

the identity of diagnostic data from a vehicle that is to be monitored for a trigger characteristic;

the trigger characteristic; and the identity of diagnostic data from a vehicle that is to be recorded in response to detection of the trigger characteristic in the diagnostic data that is to be monitored;

a diagnostic data storage system configured to store diagnostic data from the vehicle; and a processing system configured to cause the vehicle diagnostic system to:

receive from a user of the vehicle diagnostic system:

a selection of diagnostic data that is to be monitored for a trigger characteristic from among both digital and analog diagnostic data types;

the trigger characteristic; and a selection of diagnostic data that is to be recorded in response to detection of the trigger characteristic from among both the digital and analog diagnostic data types;

store the selections and the trigger characteristic in the trigger data storage system;

read the selections and the trigger characteristic from the trigger data storage system;

receive both analog and digital diagnostic data from the vehicle, including the selection of diagnostic data that is to be monitored and the selection of diagnostic data that is to be recorded;

monitor the received diagnostic data that was selected to be monitored to determine whether the received diagnostic data meets the user-specified trigger characteristic; and record the received diagnostic data that was selected to be recorded in the diagnostic data storage system in response to a determination that the trigger characteristic has been met.

2. The vehicle diagnostic system of claim 1 wherein the processing system is further configured to cause user-selected digital diagnostic data to be recorded in response to user-selected analog diagnostic data meeting the trigger characteristic.

3. The vehicle diagnostic system of claim 1 wherein the processing system is further configured to cause user-selected analog diagnostic data to be recorded in response to user-selected digital diagnostic data meeting the trigger characteristic.

4. The vehicle diagnostic system of claim 3 wherein the processing system is further configured to cause user-selected digital diagnostic data to be recorded in response to user-selected analog diagnostic data meeting the trigger characteristic.

5. The vehicle diagnostic system of claim 1 wherein:
the trigger data storage system is configured to store:
an identification of diagnostic data to be monitored of both the digital and analog type;
a trigger characteristic of both analog and digital diagnostic data; and
an identification of diagnostic data to be recorded of both the digital and analog type; and
the diagnostic data storage system is configured to store diagnostic data of both the analog and digital type.

6. The vehicle diagnostic system of claim 1 wherein:
the trigger data storage system is further configured to store a commencement time for recording the diagnostic data that is to be recorded relative to when a determination has been made that the trigger characteristic has been met; and
the processing system is further configured to cause the vehicle diagnostic system to:
receive a commencement time from the user for recording of the diagnostic data that is to be recorded relative to when a determination has been made that the trigger characteristic has been met;
store the commencement time in the trigger data storage system;
read the commencement time from the trigger data storage system; and
begin recording the received diagnostic data that was selected to be recorded at the commencement time.

7. The vehicle diagnostic system of claim 6 wherein the trigger storage system and the processing system are configured to allow the commencement time to be specified to be before or after the trigger characteristic is met.

8. The vehicle diagnostic system of claim 1 wherein:
the trigger data storage system is further configured to store a recording length for recording the diagnostic data that is to be recorded;
the processing system is further configured to cause the vehicle diagnostic system to:
receive a recording length for recording the diagnostic data that is to be recorded from the user;
store the recording length in the trigger data storage system;
read the recording length from the trigger data storage system; and
record the received diagnostic data that was selected to be recorded for the recording length in response to a determination that the trigger characteristic has been met.

9. The vehicle diagnostic system of claim 1 wherein the processing system is configured to cause the vehicle diagnostic system to repeatedly request certain types of digital diagnostic information that is selected to be recorded from the vehicle.

10. The vehicle diagnostic system of claim 1 wherein the processing system is configured to cause the vehicle diagnostic system to repeatedly request certain types of digital diagnostic information that is selected to be monitored from the vehicle.

11. The vehicle diagnostic system of claim 1 further including:
a digital data connector configured to connect to a data port on the vehicle; and
an analog probe configured to extract analog diagnostic information from the vehicle.

12. The vehicle diagnostic system of claim 1:
further including a display configured to communicate diagnostic data that is recorded in the diagnostic data storage system to the user; and
wherein the processing system is further configured to cause the diagnostic data that is stored in the diagnostic data storage system to be delivered to the display when requested by the user.

13. A vehicle diagnostic method comprising:
receiving from a user:
a selection of diagnostic data that is to be monitored for a trigger characteristic from among both digital and analog diagnostic data types;
the trigger characteristic; and
a selection of diagnostic data that is to be recorded in response to detection of the trigger characteristic from among both the digital and analog diagnostic data types;
storing the selections and the trigger characteristic;
reading the selections and the trigger characteristic;
receiving the selections of diagnostic data from the vehicle;
monitoring the received diagnostic data that was selected to be monitored to determine whether the received diagnostic data meets the user-specified trigger characteristic; and
recording the received diagnostic data that was selected to be recorded in response to a determination that the trigger characteristic has been met.

14. The vehicle diagnostic method of claim 13 wherein user-selected digital diagnostic data is recorded in response to user-selected analog diagnostic data meeting the trigger characteristic.

15. The vehicle diagnostic method of claim 13 wherein user-selected analog diagnostic data is recorded in response to user-selected digital diagnostic data meeting the trigger characteristic.

16. The vehicle diagnostic method of claim 15 wherein user-selected digital diagnostic data is recorded in response to user-selected analog diagnostic data meeting the trigger characteristic.

17. The vehicle diagnostic method of claim 13 further comprising:
receiving a commencement time from the user for recording the diagnostic data that is to be recorded relative to when a determination that the trigger characteristic has been met;
storing the commencement time;
reading the commencement time; and
beginning to record the received diagnostic data that was selected to be recorded at the commencement time.

18. The vehicle diagnostic method of claim 17 wherein the commencement time is before or after the trigger characteristic is met.

19. The vehicle diagnostic method of claim 13 further comprising:

receiving a recording length from the user for recording the diagnostic data that is to be recorded;

storing the recording length;

reading the recording length; and recording the received diagnostic data that was selected to be recorded for the recording length in response to a determination that the trigger characteristic has been met.

20. The vehicle diagnostic method of claim 13 further comprising repeatedly requesting the digital diagnostic information that was selected to be recorded from the vehicle.

21. The vehicle diagnostic method of claim 13 further comprising repeatedly requesting the digital diagnostic information that was selected to be monitored from the vehicle.

22. The vehicle diagnostic method of claim 13 further comprising connecting a digital data connector to a data port on the vehicle and attaching an analog probe to the vehicle.

23. The vehicle diagnostic method of claim 13 further comprising delivering the diagnostic data that is stored to a display when requested by the user.

24. A vehicle diagnostic system comprising a processing system configured to cause the vehicle diagnostic system to:

monitor analog diagnostic data that is received from a vehicle to determine whether the analog diagnostic data meets a user-specified trigger characteristic; and record digital diagnostic data that is received from the vehicle in response to a determination that the trigger characteristic has been met.

25. The vehicle diagnostic system of claim 24 wherein the processing system is also configured to cause the vehicle diagnostic system to receive a selection from a user of the analog diagnostic data that is to be monitored and the digital diagnostic data that is to be recorded, both from among analog and digital diagnostic data types that is received from the vehicle.

26. A vehicle diagnostic method comprising:

monitoring analog diagnostic data that is received from a vehicle to determine whether the analog diagnostic data meets a user-specified trigger characteristic; and recording digital diagnostic data that is received from the vehicle in response to a determination that the trigger characteristic has been met.

27. The vehicle diagnostic method of claim 26 further comprising receiving a selection from a user of the analog diagnostic data that is to be monitored and the digital diagnostic data that is to be recorded, both from among analog and digital data types.

28. A vehicle diagnostic system comprising a processing system configured to cause the vehicle diagnostic system to:

monitor digital diagnostic data that is received from a vehicle to determine whether the digital diagnostic data meets a user-specified trigger characteristic; and record analog diagnostic data that is received from the vehicle in response to a determination that the trigger characteristic has been met.

29. The vehicle diagnostic system of claim 28 wherein the processing system is also configured to cause the vehicle diagnostic system to receive from a user a selection of the digital diagnostic data that is to be monitored and the analog diagnostic data that is to be recorded, both from among analog and digital data types.

30. A vehicle diagnostic method comprising:

monitoring digital diagnostic data that is received from a vehicle to determine whether the digital diagnostic data meets a user-specified trigger characteristic; and recording analog diagnostic data that is received from the vehicle in response to a determination that the trigger characteristic has been met.

31. The vehicle diagnostic method of claim 30 further comprising receiving a selection from a user of the digital diagnostic data that is to be monitored and the analog diagnostic data that is to be recorded, both from among analog and digital data types.

* * * * *